United States Patent [19]

Seuret et al.

[11] 3,754,964

[45] Aug. 28, 1973

[54] PROCESS FOR THE CONTINUOUS OPTICAL BRIGHTENING OF ACYLATED CELLULOSE FIBRE MATERIAL

[75] Inventors: Marcel Seuret, Melbourne, Australia; Willi Leutenegger, Bottmingen/Basel-land, Switzerland

[73] Assignee: Ciba-Geigy Corporation, Ardsley, N.Y.; by said Leutenegger

[22] Filed: Feb. 26, 1971

[21] Appl. No.: 119,044

Related U.S. Application Data

[63] Continuation-in-part of Ser. No. 871,561, Nov. 5, 1969, abandoned, which is a continuation of Ser. No. 573,184, Aug. 18, 1966, abandoned.

[52] U.S. Cl..................... 117/33.5 T, 252/301.2 W
[51] Int. Cl............................................... C09k 3/00
[58] Field of Search.............. 117/33.5 T, 139.5 CQ; 252/162, 163, 164, 165, 166, 167, 301.2 W

[56] References Cited

UNITED STATES PATENTS

| | | | |
|---|---|---|---|
| 3,288,804 | 11/1966 | Fleck et al. | 117/33.5 T X |
| 2,096,737 | 10/1937 | Dinley | 252/163 |
| 3,135,762 | 6/1964 | Maeder et al. | 252/301.2 W X |
| 3,378,389 | 4/1968 | Schellhammer et al. | 117/33.5 T |
| 2,639,990 | 5/1953 | Dendall et al. | 117/33.5 T X |

*Primary Examiner*—Alfred L. Leavitt
*Assistant Examiner*—Caleb Weston
*Attorney*—Karl F. Jorda et al.

[57] ABSTRACT

A process for the continuous optical brightening of incompletely and completely acylated cellulose fiber material comprising impregnating the material with a solution of at least on optical brightener in a non-aqueous solution of a water-soluble organic solvent which solution also contains at least 80 percent by volume of a water-insoluble organic solvent.

16 Claims, No Drawings

PROCESS FOR THE CONTINUOUS OPTICAL BRIGHTENING OF ACYLATED CELLULOSE FIBRE MATERIAL

CROSS REFERENCE

This is a continuation-in-part of copending application Ser. No. 871,561, filed Nov. 5, 1969 now abandoned, which is a continuation of Ser. No. 573,184, filed Aug. 18, 1966, now abandoned.

DESCRIPTION OF THE INVENTION

The present invention concerns a process for the continuous optical brightening of incompletely and completely acylated cellulose fiber material, the brightening liquors used therefor and also the fiber materials otically brightened by this process.

It has been found that incompletely acylated cellulose fiber material can be optically brightened in a continuous process by impregnating this material with a non aqueous solution of at least one optical brightener in a water-soluble organic solvent, in admixture with a water-insoluble organic solvent, the amount of water-soluble solvent being up to 20 percent, preferably 2 to 10 percent by volume calculated on the total volume of the resulting mixture of solvents, and removing the excess solvent from the material.

water-soluble organic solvents suitable in particular for this purpose are those which boil below 250°C because they can be regained with relative ease. Examples of water-soluble organic solvents are benzylalcohols, ketones such as low aliphatic ketones, preferably having 3 – 8 carbon atoms, e.g. acetone or methylethyl ketone, or cyclic ketones, preferably having 5 – 8 carbon atoms, e.g., cyclohexanone; low ethers such as cyclic ethers, preferably having 4 – 6 carbon atoms, e.g., dioxan, or open chain ethers, especially hydroxyalkyl ethers, preferably having 3 – 8 carbon atoms for example ethylengelycol monoalkylether, such as ethylenglycol monomethylether or ethylenglycolmonoethylether; amides of low fatty acids, preferably having 1 – 10 carbon atoms, e.g., formamide dimethyl formamide or dimethylacetamide; dialkyl sulphoxides preferably having 2 – 6 carbon atoms, e.g. dimethyl sulphoxide; or tertiary organic amines, preferably having 3 – 10 carbon atoms, e.g., pyridine or cyclic carboxylic amides having 4 – 8 carbon atoms, for example N-alkylpyrrolidones such as N-methyl-pyrrolidone -(2); hexaalkylphosphoric triamide having six to 18 carbon atoms such as hexamethyl phosphoric triamide; ethylenecarbonate, as well as mixtures thereof.

For the same reason as given in the previous paragraph, preferred water-insoluble organic solvents are those which boil below 250°C, particularly between 70° and 150°C. Examples thereof are: aromatic hydrocarbons such as benzol toluene or xylene, preferably however, halogenated, particularly chlorinated, hydrocarbons, e.g., aromatic hydrocarbons such as chlorobenzene, mainly however, low aliphatic halogenated hydrocarbons such as chlorinated hydrocarbons, e.g., carbon tetrachloride, chloroform, tri-or, tetra-chloroethylene, tri-ortetrachloroethane or dibromoethylene. Also mixtures of such solvents such as gasoline can be used as water insoluble component of mixtures of solvents.

In choosing the mixture of solvents, care should be taken that there is no or only the slightest possible injury done to the fibers with an optimal white effect.

Particularly good brightenings accompanied by almost no injury to the fiber are obtained with mixtures of at least one water soluble organic solvent with at least one water insoluble organic solvent. The ratio of mixture depends on the type of brightener and the solvents, the quality of the fibers and the apparatus available. A particularly favourable solvent mixture consists of 95 percent of volume of tetra-chlorethylene and 5 percent by volume of N-methylpyrrolidone. (2)

The optical brighteners usable according to the invention can belong to any classes of brighteners desired. Suitable brighteners are, e.g., stilbene compounds such as 4,4'-bis-triazinylaminostilbene sulphonic acids, then stilbyl triazoles, particularly stilbyl naphthotriazoles or acenaphthenotriazoles, also coumarins such as 3-aryl-7-subst. aminocoumarin or benzocoumarin derivatives, also pyrazines such as 3,5-dialkylamino-pyrazine-2,6-dicarboxylic acid- alkyl- or -aryl- amides, pyrazolines such as 1,3-diphenyl- or 1,3,5-triphenyl- pyrazolines, oxazine compounds such as 3,3'-dialkyl-oxyacyanines or 3,3',5,5'-tetra-alkyl-oxacyanines, or the acid salts of these compounds, dibenzoxazolyl or dibenzimidazolyl compounds such as dibenzoxazolyl- or dibenzimidazolyl- ethylenes, -furans or -thiophenes as well as napthalic acid imides.

Particularly beautiful brightening effects are obtained with brighteners of the coumarin series such as 3-phenyl-7-[3'-alkylpyrazolyl-(1')]-coumarins 3-phenyl-7-[naphtho-(1'',2'':4', 5')-triazolyl-(2')]-coumarins, 3-phenyl-7-[s-triazinylamino]-coumarins and brighteners of the pyrazoline series.

Depending on the type of optical brightener, the brightening liquors used according to the invention preferably contain 0.01 to 10 percent by weight of one or more of the brighteners mentioned.

By incompletely acylated cellulose fibre material is meant, principally, cellulose-2½-acetate. This fibre material can be brightened according to the invention in any form desired, e.g., in the form of flocks, slubbing, yarn or - preferably - fabrics.

The fibre material is impregnated, e.g., by printing or spraying, particularly however, by pad dyeing in the foulard. In the latter case, the fibre material is advantageously passed continuously through the brightening liquor at room temperature and then squeezed out to the desired content of the impregnation solution of about 30 to 150 percent by weight (calculated on the weight of the goods). The main part of the solvent remaining in the fibre material is then removed under mild conditions at 30° – 100°. Contact heat, a treatment with high frequency alternating current or infra-red irradiation is suitable for this purpose. Preferably, however, the solvent is removed in a stream of hot air.

Very effective, level and fast optical brightenings, e.g., fast to dry cleaning and washing, are obtained by the process according to the invention or completely acylated cellulose. An advantage of the process according to the invention over previously known processes, particularly those working with water insoluble solvents in the dry cleaning process, is that a good and wash-fast white effect is obtained even after impregnation of the material so that a subsequent thermic treatment, e.g., steaming, of the impregnated goods, is not necessary. Another advantage of the new brightening process is that the brightened fibres surprisingly retain their silky handle whilst the characteristic handle is substantially forfeited by the usual processes with aqueous brightener liquors. In addition, the new process has the advantage over previously known brightening methods which use aqueous dispersions, that in producing the brightening liquors to be used, the brightener can be used direct as it is technically obtained and dissolved in the solvents whilst brightening from aqueous dispersions necessitates finely distributed optical brighteners which have to be produced by time-consuming milling operations with suitable dispersing agents.

As, in the technical performance of the process, the solvents used are regained and again used for brightening, in contrast to previously known processes, there is no problem of purification of waste water. In addition, rinsing baths are no longer necessary, which is a further advantage.

The following examples illustrate the invention. The temepratures are given therein in degrees Centigrade. Ethylenglycol monomethylether and ethylenylycol monoethylether are denoted as methylcellosolve and ethylcellosolve, and tetrachloroethylene is denoted as perchloroethylene.

EXAMPLE 1

2½ g of the optical brightener of the formula

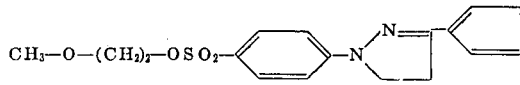

are dissolved cold in 40 ml of N-methylpyrrolidone. This clear solution is mixed with 960 ml of perchloroethylene. The clear, fluorescent brightening liquor obtained is used on a padding mangle to impregnate, with a squeeze effect of about 70 percent by weight, a cellulose 2½-acetate fabric. It is dried in a stream of air at 60°C. A beautiful brightening effect is obtained having a high degree of brilliant whiteness.

When the cellulose 2½-acetate fabric is replaced by cellulose triacetate fabric, a similar beautiful brightening effect is obtained.

EXAMPLES 2 – 30

When the procedure of Example 1 is repeated, using the solvents or combinations of solvents given in the following Tables I and II in column 2 in the volume ratios given in column 3, the results obtained on cellulose 2½-acetate and triacetate fabric are given in columns 4.

TABLE I

| Example | Brightening of 2½-acetate solvent or solvent combination | Vol.% | results*) |
|---|---|---|---|
| 2 | trichloroethylene/ N-methylpyrrolidone (2) | 98/2 | ++ |
| 3 | trichloroethylene/ dimethylformamid | 96/4 | ++ |
| 4 | perchloroethylene/ methylcellosolve | 90/10 | + |
| 5 | " | 80/10 | ++ |
| 6 | perchloroethylene/ ethylcellosolve | 80/10 | ++ |
| 7 | perchloroethylene/ dimethylsulfoxide | 94/6 | ++ |
| 8 | perchloroethylene/ acetone | 80/20 | ++ |
| 9 | perchloroethylene/ dimethylformamide | 94/6 | ++ |
| 10 | perchloroethylene/ dimethylacetamide | 94/6 | ++ |
| 11 | perchloroethylene/ hexamethyl-phosphoric acid triamide | 94/6 | + |
| 12 | xylene/N-methyl pyrrolidone (2) | 94/6 | ++ |
| 13 | toluene/N-methyl pyrrolidone (2) | 94/6 | ++ |
| 14 | benzine/N-methyl pyrrolidone (2) | 94/6 | ++ |
| 15 | benzene/N-methyl pyrrolidone (2) | 94/6 | ++ |
| 16 | carbontetrachloride/ N-methyl-pyrrolidone (2) | 94/6 | ++ |
| 17 | chlorobenzene/ N-methylpyrrolidone (2) | 94/6 | ++ |
| 18 | trichloroethane/ N-methylpyrrolidone (2) | 94/6 | |
| | trichloroethylene | 100 | ++ |
| | perchloroethylene | 100 | – |

*) – = no effect
*) + = good effect
*) ++ = very good effect

TABLE II

| Example | Brightening of triacetate solvent combination | Vol.% | results*) |
|---|---|---|---|
| 19 | trichloroethylene/ N-methylpyrrolidone (2) | 98/2 | + |
| 20 | " | 94/6 | ++ |
| 21 | perchloroethylene/ methylcellosolve | 80/10 | + |
| 22 | perchloroethylene/ dimethylsulfoxide | 94/6 | ++ |
| 23 | perchloroethylene/ dimethylacetamide | 94/6 | + |
| 24 | xylene/N-methyl pyrrolidone (2) | 94/6 | ++ |
| 25 | toluene/N-methyl pyrrolidone (2) | 94/6 | ++ |
| 26 | benzine/N-methyl pyrrolidone (2) | 94/6 | ++ |
| 27 | benzene/N-methyl pyrrolidone (2) | 94/6 | ++ |
| 28 | carbon tetrachloride/ N-methyl-pyrrolidone (2) | 94/6 | 30 + |
| 29 | chlorobenzene/ N-methylpyrrolidone (2) | 94/6 | ++ |
| 30 | trichloroethane/ N-methylpyrrolidone (2) | 94/6 | ++ |

*) + = good effect
++ = very good effect

EXAMPLE 31

3 g of the optical brightener of the formula

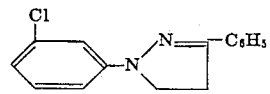

are dissolved in a mixture of 950 ml of perchloroethylene and 50 ml of N-methylpyrrolidone- (2). This solution is used on a padding mangle to impregnate, with a squeeze effect of about 70 percent, a cellulose 2½-acetate fabric. The impregnated strips of fabric are then dried at 90°C in a stream of air. This procedure is repeated using cellulose triacetate fabric.

The cellulose 2½-acetate and cellulose triacetate samples thus treated have a high degree of whiteness which is fast to washing.

EXAMPLES 32 – 33

When the procedure of Example 31 is repeated, using 2½ g of the optical brightener dissolved in the combinations of solvents given in Table III in column 2 in the volume ratios given in column 3, the results obtained on cellulose 2½-acetate and triacetate fabric are given in columns 4 and 5, respectively, of the following Table III.

TABLE III

| Example | solvent combinations | Vol.% | results *) 2½ acetate | triacetate |
|---|---|---|---|---|
| 32 | trichloroethylene/ N-methyl-pyrrolidone (2) | 94/6 | ++ | ++ |
| 33 | perchloroethylene/ N-methyl-pyrrolidone (2) | 94/6 | ++ | ++ |

*) ++ = very good effect

EXAMPLE 34

2 g of the optical brightener of the formula

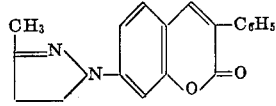

are dissolved, by heating gently in 30 ml of dimethyl acetamide, and the clear, fluorescent solution obtained is mixed with 970 ml of trichloroethylene. A cellulose 2½-acetate fabric is padded with a squeeze effect of about 80 percent with this solution at room temperature. It is then dried at 70°C in a dry stream of air. A brilliant, wash-fast optical brightening effect which has a high degree of whiteness and is fast to dry cleaning with perchloroethylene is obtained.

EXAMPLES 35 – 36

When the procedure of Example 34 is repeated, using 2½g of the optical brightener dissolved in the combinations of solvents given in Table IV in column 2 in the volume ratios given in column 3, and the squeezing effect is about 70 percent the results obtained on cellulose 2½-acetate and triacetate fabric are given in columns 4 and 5, respectively, of the following Table IV.

TABLE IV

| Example | solvent combinations | Vol.% | results *) 2½ acetate | triacetate |
|---|---|---|---|---|
| 35 | trichloroethylene/ N-methyl-pyrrolidone (2) | 96/4 | ++ | ++ |
| 36 | perchloroethylene N-methyl-pyrrolidone (2) | 94/6 | ++ | ++ |

*) ++ = very good effect

EXAMPLE 37 – 52

If, instead of the brightener mentioned in the example 34, one of the brighteners mentioned in column 3 of the following Table V is used in gram (g) given in column 2 and otherwise the procedure given in the example is followed, then beautiful, wash-fast brightenings having a good degree of whiteness are also obtained.

TABLE V

| Number: | G./lt. | Optical brightener |
|---|---|---|
| 37 | 2 | 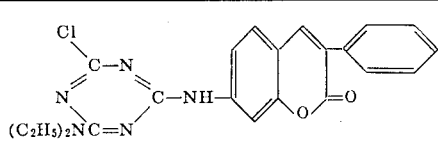 |
| 38 | 2 | 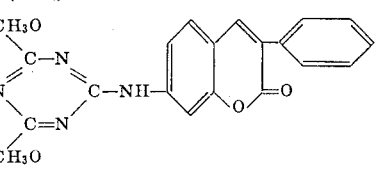 |
| 39 | 2½ | Same as above. |
| 40 | 3 | 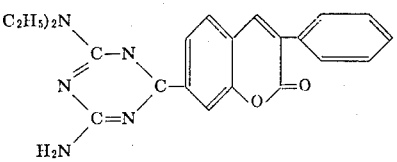 |
| 41 | 2 | 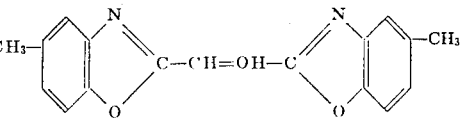 |
| 42 | 2 | 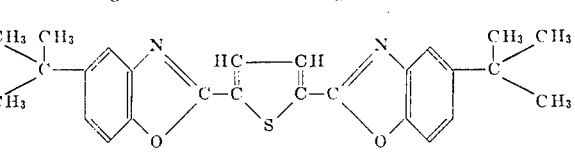 |
| 43 | 2 | 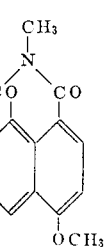 |

Table V - Continued

| G./lt. | Optical brightener |
|---|---|
| 44 ..... 2 | 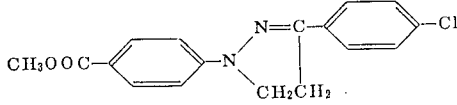 |
| 45 ..... 2½ | 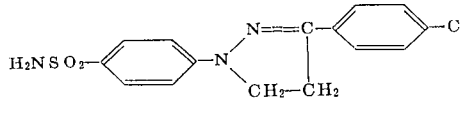 |
| 46 ..... 2 | 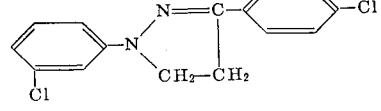 |
| 47 ..... 2 | 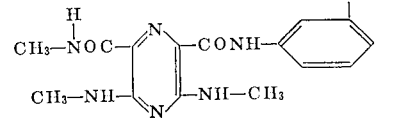 |
| 48 ..... 2½ | 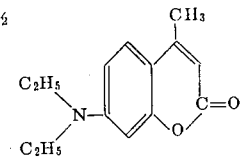 |
| 49 ..... 3 | 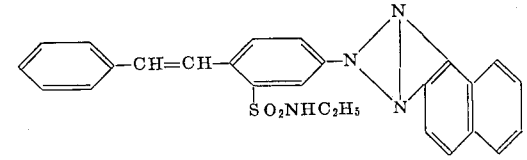 |
| 50 ..... 2 | 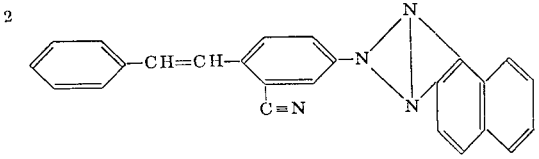 |
| 51 ..... 2 | 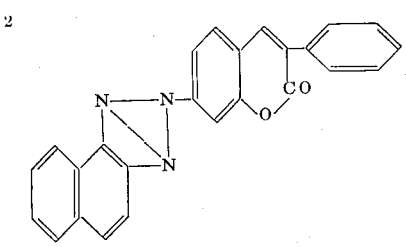 |
| 52 ..... 2 | 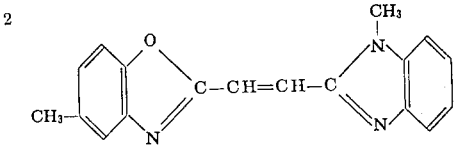 |

EXAMPLES 53 to 56

2½ g of the optical brightener given in Example 34 are dissolved cold in 50 ml of one of the solvents listed in Table VI and then diluted with perchloroethylene to make up 1,000 ml. When these solutions are used to pad cellulose 2½-acetate fabric, with a squeeze effect of about 50 percent and then dried at temperatures of 60°C in a stream of air; beautiful, brilliant optical brightening effects having a high degree of whiteness are obtained.

TABLE VI

| Expl. No. | Solvent |
|---|---|
| 53 | dimethyl sulfoxide |
| 54 | dimethyl formamide |
| 55 | methyl cellosolve (= ethylene glycol monomethyl ether) |
| 56 | hexamethyl phosphoric acid triamide |

With the padding liquors of Examples 53 and 54, optical brightening effects having a high degree of whiteness are also obtained on cellulose triacetate fabric.

EXAMPLES 57 – 61

2½ g of the optical brightener of the formula

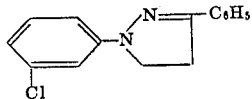

are dissolved cold in 900 ml of trichloroethylene. 100 ml of one of the solvents listed in Table VII are added thereto and a partially acetylated cellulose fabric is padded with this liquor with a squeeze effect of about 80 percent. After drying the fabric at 80°C, beautiful optical brightening effects are obtained.

TABLE VII

| Expl. No. | Solvent |
|---|---|
| 57 | ethylene glycol monomethyl ether |
| 58 | dioxane |
| 59 | acetone |
| 60 | ethyl methyl ketone |
| 61 | benzyl alcohol |

We claim:

1. A process for the continuous optical brightening of incompletely or completely acylated cellulose fiber material comprising
   a. impregnating the said material with a solution of an optical brightener in water soluble organic solvent boiling below 250°C to which at least 80 percent by volume of water-insoluble organic solvent boiling below 250°C calculated on a total volume of the resulting mixture has been added, wherein the amount of said optical brightener ranges from about 0.01 to 10 percent by weight calculated on the total weight of the said solution, and
   b. removing excess solvent from the material.

2. A process as defined in claim 1, wherein said water-soluble solvent is cyclic carboxylic acid amide having four to eight carbon atoms.

3. A process as defined in claim 1, wherein said optical brightener is dissolved in a mixture consisting of 95 percent by volume of tetra-chloroethylene and 5 percent by volume of N-methylpyrrolidone.

4. A process as defined in claim 1, wherein said optical brightener is a phenyl coumarin.

5. A process as defined in claim 4, wherein said phenyl coumarin is selected from the group consisting of a 3-phenyl-7-[3'-alkyl-pyrazolyl-(1')]-coumarin, a 3-phenyl-7-[naphtho-(1'',2'':4',5')-triazolyl-(2')-coumarin and a 3-phenyl-7-[s-triazinylamino]-coumarin.

6. A process as defined in claim 1, wherein said optical brightener is an optically brightening pyrazoline.

7. A process as defined in claim 1, wherein the content of said water, insoluble solvent is from 90 to 99 percent by volume of the total volume of the mixture of water-soluble solvent and water-insoluble solvent.

8. A process as defined in claim 7, wherein said water-soluble solvent is N-alkylpyrrolidone.

9. A process as defined in claim 7, wherein said water-insoluble solvent is tetra-chloroethylene.

10. A process as defined in claim 7, wherein said water-soluble solvent is selected from benzyl alcohol, an aliphatic ketone, having 3 – 8 carbon atoms, cyclohexanone, dioxan, ethylenglycol monoalkylether having 3 – 8 carbon atoms, fatty acid amide having 1 – 10 carbon atoms, di-alkyl sulfoxide having 2 – 6 carbon atoms, pyridine, N-alkyl-pyrrolidone having 4 – 8 carbon atoms, hexaalkyl phosphoric triamide having 6 – 18 carbon atoms and ethylene carbonate.

11. A process as defined in claim 7, wherein said water-insoluble organic solvent is selected from the group consisting of benzene toluene, xylene, and a halogenated hydrocarbon having a boiling point between 70° and 150°C.

12. A process as defined in claim 7, wherein said water-insoluble organic solvent is a halogenated lower aliphatic hydrocarbon.

13. A process as defined in claim 7, wherein said water-insoluble organic solvent is selected from the group consisting of carbon tetrachloride, trichloroethylene, tetrachloroethylene, tetrachloroethane and dibromoethylene, and wherein said water-soluble solvent is cyclic carboxylic acid amide having 4 – 8 carbon atoms.

14. A process as defined in claim 7, wherein said incompletely acylated cellulose fiber material is cellulose 2½-acetate fiber material.

15. A process as defined in claim 7, wherein said excess solvent is removed from the impregnated fiber material at a temperature of from 30° – 100°C and in such amount as to leave in said material a liquid amount of about 30 to 150 percent calculated on the dry weight of said material.

16. A brightening liquor comprising an optical brightener, a water-soluble organic solvent boiling below 250°C, and at least 80 percent by volume calculated on the total volume of the resulting mixture of a water-insoluble organic solvent boiling below 250°C wherein the amount of said optical brightener ranges from about 0.01 to 10 percent by weight calculated on the total weight of the said liquor.

* * * * *